J. R. BAIRD.

Wheel for Vehicles.

No. 8,930. Reissued Oct. 14, 1879.

Attest.
Edmund
J. C. Robinson Jr.

Inventor.
James R. Baird
by James H. Layman
his Attorney

N. PETERS, PHOTO-LITHOGRAPHER, WASHINGTON, D. C.

UNITED STATES PATENT OFFICE.

JAMES R. BAIRD, OF CINCINNATI, OHIO.

IMPROVEMENT IN WHEELS FOR VEHICLES.

Specification forming part of Letters Patent No. 117,142, dated July 18, 1871; Reissue No. 4,567, dated September 26, 1871; Reissue No. 8,930, dated October 14, 1879; application filed August 21, 1879.

*To all whom it may concern:*

Be it known that I, JAMES R. BAIRD, of Cincinnati, Hamilton county, Ohio, but formerly a resident of Vincennes, Knox county, Indiana, have invented certain new and useful Improvements in Wheels for Vehicles, of which the following is a specification.

This invention relates exclusively to those wheels whose spokes are inserted in the hub in what is generally known as the "dodged" or "staggered" position; and my improvement comprises a novel combination of wooden core, metallic band, and spokes, which spokes are formed with peculiarly-constructed tenons, shoulders, and feet.

The tenons enter suitable mortises in the wooden core or central member of the hub, while the shoulders that unite said tenons to the feet bear directly upon the periphery of this core, thereby affording a comparatively yielding or elastic seat for the staggered spokes.

The sides of the feet are perfectly parallel, not radial or converging, and fit tightly within suitable recesses or mortises in the single metallic shell or strengthening-band that surrounds the core, by which arrangement said band or shell braces the spokes against lateral strains, and thereby adds to the security and durability of the wheel.

Figure 1:
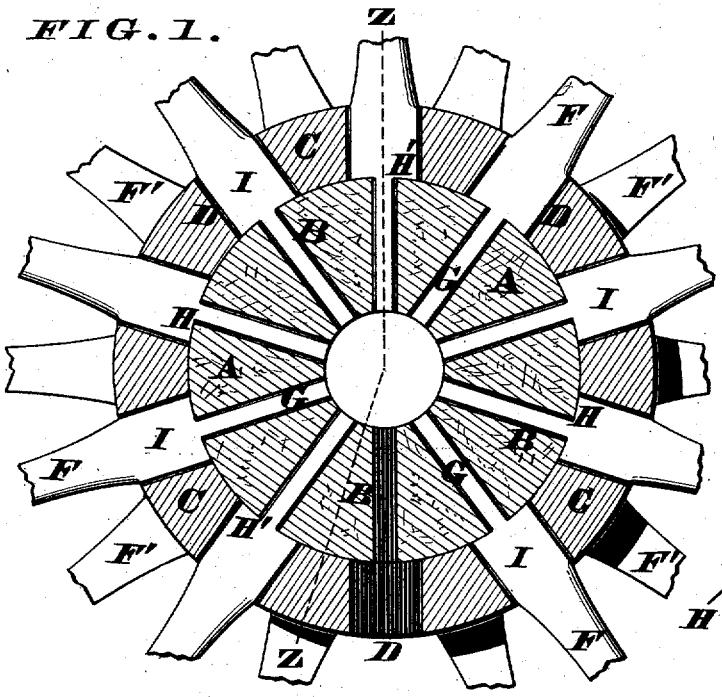
Figure 3:
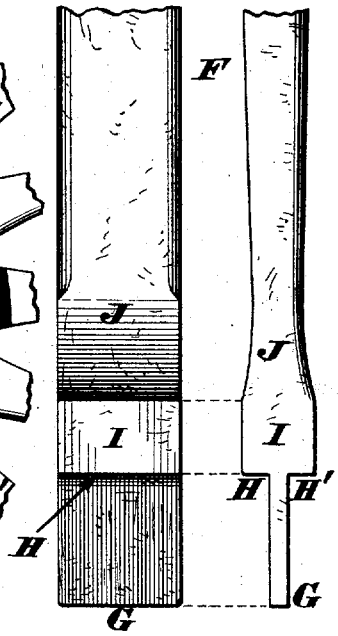
Figure 2:
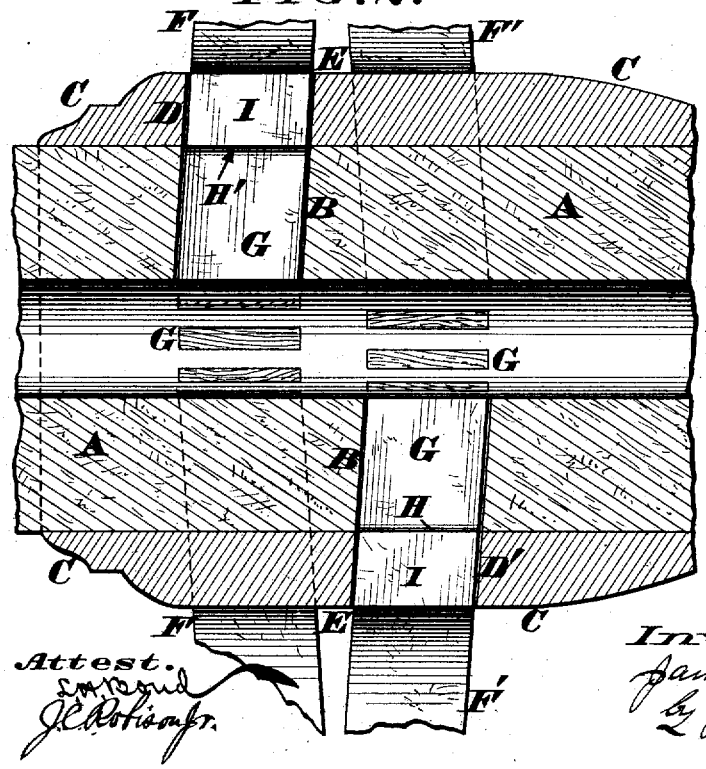
Figure 4:
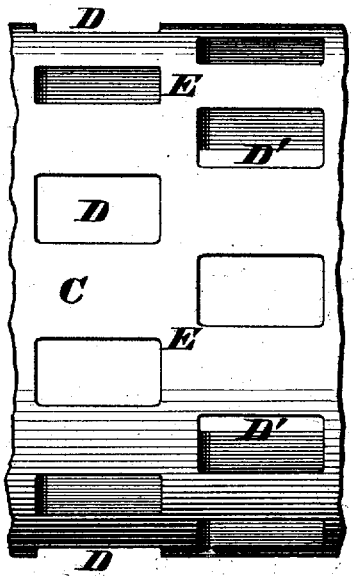

In the accompanying drawings, Figure 1 is a transverse section of the hub of my wheel, one of the mortises and sockets of the same being shown as unprovided with a spoke. Fig. 2 is an axial section of a portion of the hub, taken at the line Z Z of Fig. 1. Fig. 3 is a front and side elevation of one of the spokes detached from the hub, and Fig. 4 is a plan of the mortised portion of the metallic band or shell.

The central member of my hub consists of a wooden core, A, of any suitable size and shape, said core being provided with customary mortises B, to receive the spoke-tenons G, as hereinafter more fully described.

Furthermore, this core has applied to it a metallic shell, band, or ring, C, which, being a single casting, combines strength with simplicity and cheapness of construction.

This shell or band is provided with two separate rows of mortises or sockets, D D′, separated by a web, E, to afford the necessary straddle of the spoke-feet. The sides of these sockets do not converge or slope inwardly, as is customary, but are perfectly parallel or straight-sided, as represented in Fig. 1.

F F′ represent, respectively, the two sets of spokes, each of said spokes being made with a tenon, G, to enter a mortise, B, of the wooden core A. The outer end of each tenon is joined to two shoulders, H H′, which shoulders project about at right angles to said tenon; and these shoulders are adapted to rest upon the outer periphery of the core A when the spokes are driven home.

In addition to these shoulders and tenon, each spoke has a foot, I, whose sides are parallel or straight, not converging; and this foot joins the throat J of the spoke, as more clearly shown in Fig. 3.

In constructing my improved wheel, the wooden core A is first driven into the metallic ring C, and the mortises B are then cut in said core in the usual manner, these mortises being inclined, as shown in Fig. 2, for the purpose of pitching the spokes, so that the outer ends of the two sets F F′ may be secured to the felly. As soon as these spokes are driven home, their tenons G completely fill up the mortises B, while the shoulders H H′ bear firmly and in a comparatively extended manner against the outer periphery of the wooden core A. At the same time the straight feet I are securely housed within the sockets D D′ of ring C, which ring now serves to brace the spokes against lateral strains.

I am aware it is not new to strengthen a staggered wheel by means of a single metallic band applied around the wooden hub, which band has sockets to admit the beveled spoke-feet, the spokes being tenoned into suitable mortises in said wooden hub, and seating on the periphery of the same, as this construction is seen in Letters Patent No. 88,720, issued April 6, 1869, to G. Kenny.

Such being the state of the art, my claim is not designed to be expanded to cover a wheel whose spoke-feet are beveled or tapered; but the invention is expressly limited to the specific combination herein described—that is to say, to a staggered wheel the wooden hub of which is strengthened by a single metallic band whose sockets have parallel sides to admit the straight feet of the spokes, said spokes being tenoned into the wooden hub and seating upon the outer periphery of the same.

I claim as my invention—

In a staggered-spoke wheel, the mortised wooden hub A B, surrounded with a single metallic band, C, whose sockets D D′ have parallel sides and receive the straight feet I of spokes F F′, said spokes being provided with tenons G, that enter the mortises B, while the shoulders H H′ of said spokes seat upon the outer periphery of said wooden hub A, as herein described and set forth.

In testimony of which invention I hereunto set my hand.

JAMES R. BAIRD.

Witnesses:
JAMES H. LAYMAN,
WM. S. LONGACRE.